(12) United States Patent
Siegel

(10) Patent No.: US 6,850,982 B1
(45) Date of Patent: Feb. 1, 2005

(54) METHODS AND APPARATUS FOR DIRECTING A FLOW OF DATA BETWEEN A CLIENT AND MULTIPLE SERVERS

(75) Inventor: Kenneth P. Siegel, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 780 days.

(21) Appl. No.: 09/741,495

(22) Filed: Dec. 19, 2000

(51) Int. Cl.[7] .............................................. G06F 15/16
(52) U.S. Cl. ....................... 709/227; 709/709; 709/203
(58) Field of Search ................................ 709/226, 227, 709/228, 203, 219, 238, 239, 234, 224, 223, 229, 217, 218; 370/352, 401; 713/201; 707/10

(56) References Cited

U.S. PATENT DOCUMENTS

| | | | | |
|---|---|---|---|---|
| 5,774,660 A | * | 6/1998 | Brendel et al. ............. | 709/201 |
| 5,867,652 A | * | 2/1999 | Hurvig ....................... | 709/203 |
| 5,941,988 A | * | 8/1999 | Bhagwat et al. ............ | 713/201 |
| 6,006,264 A | * | 12/1999 | Colby et al. ................ | 709/226 |
| 6,173,322 B1 | * | 1/2001 | Hu ............................ | 709/224 |
| 6,185,601 B1 | * | 2/2001 | Wolff ......................... | 709/203 |
| 6,389,462 B1 | * | 5/2002 | Cohen et al. ................ | 709/218 |
| 6,411,986 B1 | * | 6/2002 | Susai et al. .................. | 709/203 |
| 6,438,597 B1 | * | 8/2002 | Mosberger et al. ......... | 709/227 |
| 6,522,880 B1 | * | 2/2003 | Verma et al. ................ | 455/436 |
| 6,598,077 B2 | * | 7/2003 | Primak et al. .............. | 709/219 |
| 6,694,350 B2 | * | 2/2004 | Kurashima et al. ......... | 709/203 |

* cited by examiner

Primary Examiner—Ario Etienne
Assistant Examiner—Abdullahi E. Salad
(74) Attorney, Agent, or Firm—Chapin & Huang, L.L.C.; David E. Huang, Esq.

(57) ABSTRACT

The invention is directed to techniques for managing communication between a client and multiple servers over a network through an intermediary network device (e.g., content switch). In response to a request for content from a client, the network device selects a server to respond to the request. The network device includes a flow manager that manages the flow of data from the server through the network device to the client. In response to a second request, the network device may select a different server to respond to the request. In this case, the flow manager manages the flow of data from the new server through the network device transparently for the client, so that the client communicates only through the network device regardless of which server is providing the response to the requests.

15 Claims, 7 Drawing Sheets

METHODS AND APPARATUS FOR DIRECTING A FLOW OF DATA BETWEEN A CLIENT AND MULTIPLE SERVERS

BACKGROUND OF THE INVENTION

Historically, networks include computers and network devices, such as switches and routers, that facilitate the flow of data from one computer and/or device to another. Typically, a client computer (or client) makes a request for data from a remote server computer (or server). The request travels over the network and through intermediate devices, such as routers and switches, to a particular server which is capable of responding to the request. The server then provides the requested data, which travels over the network back to the client.

One way for the client to send such a request to the server is for the client to establish a pathway between the client and the server. One example of such a pathway is a TCP (Transmission Control Protocol) connection, which is a bi-directional, full-duplex pathway. This connection requires several transmissions to establish and synchronize a connection between the client and the server. Then the client makes the request for data, such as a content request based on HTTP (Hypertext Transport Protocol), which the client transmits over the already established TCP network connection to the server.

At one time, the HTTP protocol required that the client and server establish a new TCP connection for each request from the client. The HTTP version 1.1 protocol (and the HTTP version 1.0 protocol with "keep-alive" functionality) allows the client to make more than one request over the same TCP connection to the same server. Typically, a network switch allows more than one request (e.g., a GET request based on HTTP 1.1) to be made to the same server over an established TCP connection routed through the switch.

SUMMARY OF THE INVENTION

Some network switches (e.g. content switches), before establishing a TCP connection between the client and the server, direct the request to a server based on the content that is specified in the request. For example, the network switch may direct the request to one server if the requested content is text-based, and to another server if the requested content is image-based. If the client makes a request intended for another server, or the switch directs the request to a new server, then the client and the new server must establish a new TCP connection. Typically, if the network switch is directing the client to send the request to a new server, then the network switch sends a redirect request to the client, which requests the client to make a new request (e.g., HTTP request) that is directed to the new server. As part of making the new request, the client and new server establish a new TCP connection, and the client then makes the new request over the new TCP connection to the new server.

If the client must initiate a new connection when making a content request to a new server, then the client must expend the overhead of terminating the TCP connection and then transmitting several signals to establish a new TCP connection between the client and the new server, as required by the TCP protocol. In such an approach, the client must wait until the new TCP connection is established before providing the request to the new server.

In contrast, the invention is directed to techniques for managing communication between a client and multiple servers using multiple pathways in a single connection session between the client and a network device (e.g., content switch). This eliminates the need to reform a connection to the client and greatly improves overall system performance.

One arrangement of the invention includes establishing pathways between a client and multiple servers through a network device to service multiple requests from the client that are best served by using multiple servers. A flow manager in a network device (e.g. content switch) establishes pathways between the client and one or more servers to handle requests from the client in a manner that is transparent to the client, so that, from the client's viewpoint, the client maintains communication only with a virtual server (e.g. content switch) while receiving responses from different servers.

In one embodiment, the invention is directed to a network device (e.g., content switch) for managing communication between a client and multiple servers. The network device includes an input/output controller, and a flow manager in communication with the input/output controller. The input/output controller is configured to receive a set of data requests. Each data request belongs to a single connection session. The flow manager is configured to provide a first data pathway between the client and a first server through the input/output controller in response to a first data request of the set of data requests and to provide a second data pathway between the client and a second server through the input/output controller in response to a second data request of the set of data requests. The flow manager typically establishes the second data pathway if the first server cannot handle the second data request, or is unavailable for some other reason. The second data pathway includes a portion of the first data pathway that extends between the client and the input/output controller. Thus, the client can send a second request in the same connection session to a network device that uses a different server to respond to the request than the one used to respond to the first request from the client. As far as the client is concerned, the client maintains and communicates over a portion of the same pathway (that is, the part of the pathway from the client to the network device, which remains the same for both the first and second pathways), while the network device establishes and maintains the part of the second pathway extending from the network device to the new server. The network device assumes the overhead of establishing the pathways from the client to different servers and provides data from the servers in response to multiple requests from the client over the pathway. The approach of the invention eliminates the need to reform TCP connections to the client and thus improves overall system performance.

In another embodiment, the flow manager is configured to establish, as the portion of the first data pathway, a first network connection between the client and the network device and to establish a second network connection between the network device and the first server. Thus, the client communicates with network device and is not required to maintain a connection directly with the first server.

In a further embodiment, the flow manager is configured to maintain the first network connection between the client and the network device, and to establish a third network connection between the network device and the second server. Thus, the client can make requests to another server (e.g., the second server) without being required to establish and maintain a direct connection with the other server. The client only maintains the existing connection (e.g., first network connection) already established between the client and the network device. The flow manager remaps the content request that was serviced by the first server and forms a new TCP connection to the second server that can satisfy a new request from the client.

In another embodiment, the flow manager is configured to send, prior to establishing the third network connection, a request to the first server to close the first network connection between the client and the network device. The flow manager closes the first network connection to prevent any data transmissions from the first server becoming intermingled with the data transmissions from the second server, when the network device transmits the data transmissions from the second server to the client.

The flow manager of the network device, in another embodiment, is configured to select, as a destination of the first data pathway, the first server from the multiple servers based on a content type indicated by the first data request. In a further embodiment, the flow manager is configured to select, as a destination of the second data pathway, the second server from the multiple servers based on a content type indicated by the second data request. For example, if the first request is for text content, the flow manager selects the first server, which is set up to service requests for text content. If the second request is for audio content, the flow manager selects the second server, which is set up to service requests for audio content.

In another embodiment, the input/output controller is configured to receive a synchronization signal (e.g., TCP SYN frame) from the client. The flow manager is configured to provide a first initial sequence number to the client that initializes a sequence space based on a first set of network device sequence numbers provided from the network device to the client. The client establishes its own series of sequence numbers (according to TCP) based on an initial sequence number sent from the client to the network device and selected by the client independently of the first initial sequence number sent from the network device to the client. The input/output controller is configured to receive a second initial sequence number from the first server. The flow manager is configured to generate a first modification value (e.g., offset value) and to modify a first set of server sequence numbers based on the first modification value to provide a second set of network device sequence numbers from the network device to the client that preserves the sequence space initialized by the first initial sequence number provided to the client. For example, after establishing the TCP connection between the client and the network device, the flow manager generates an offset value based on the initial sequence number received from the first server when first setting up the network connection (e.g., TCP connection) between the first server and the network device. The flow manager then programs a fastpath module to add the offset value from the sequence numbers received with data from the first server to generate the sequence numbers to be used with the same data when transmitted from the network device to the client. Thus, the flow manager programs the fastpath module to preserve the sequence space already established between the client and the network device when providing data received from the server through the network device to the client.

In another embodiment, the input/output controller is configured to receive a second initial sequence number from the second server. The flow manager is configured to generate a second modification value and to modify a second set of server sequence numbers based on the second modification value to provide a third set of network device sequence numbers from the input/output controller to the client. The third set of network device numbers preserves the sequence space established by the first initial sequence number provided to the client from the network device. The flow manager generates the offset value and uses it to modify the sequence numbers from the second server, in a manner similar to modification of sequence numbers from the first server, as described previously. Thus, the flow manager recalculates the offset and programs the fastpath module with the new offset to preserve the sequence space already established between the client and the network device when providing new data received from a new server through the network device to the client in response to an additional request from the client.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for managing communication between a client and multiple servers using multiple pathways in a single connection session between the client and a network device (e.g., content switch). A flow manager (e.g., a computer processor operating in accordance with an application or other software program fulfilling the techniques of the invention) manages the flow of data through the network device. The network device establishes multiple pathways between the client and different servers to handle requests for data from the client that are best served by responses from different servers for different requests. The network device can decide in a flexible manner which server to use to respond to the client's request based on such criteria as the content of the request, quality of service, and/or other factors. The part of the pathways that extends from the client to the network device remains constant, while the flow manager establishes the parts of the pathways from the network device to different servers. Thus, the network device does not require the client to establish a new pathway for each request that is to be serviced by a different server, and the flow manager assumes the overhead of establishing the different pathways from the client to each different server.

Figure 1:
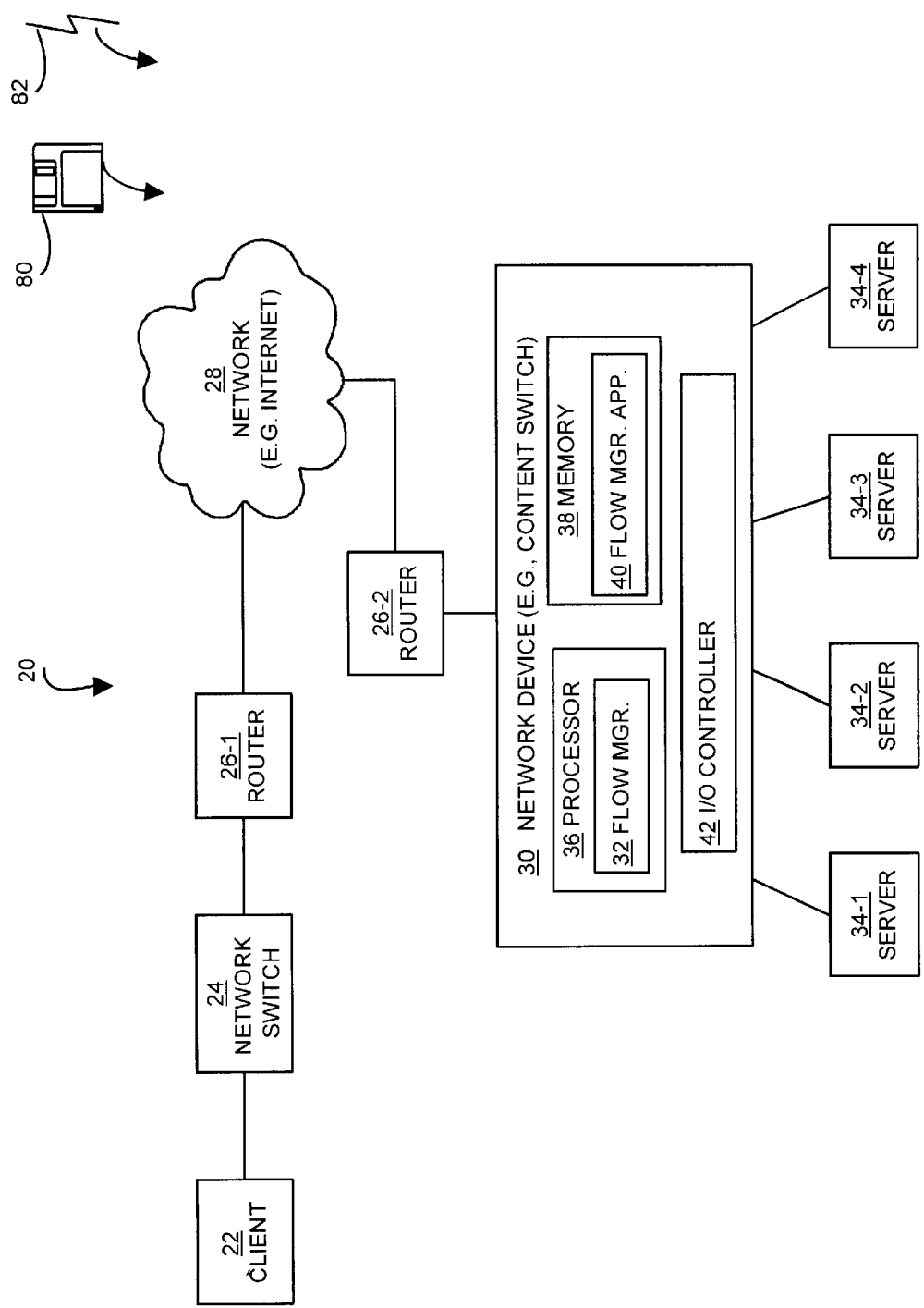
FIG. 1 shows a block diagram of a network connection system which is suitable for use by the invention.

FIG. 1 shows a block diagram of a network connection system 20 which is suitable for use by the invention. The network connection system 20 includes a client 22, network switch 24, routers 26-1 and 26-2 (referred to generally as routers 26), network 28 (e.g., Internet), network device 30 (e.g. content switch), and servers 34-1 through 34-4 (referred to generally as servers 34). The network device 30 includes a processor 36, memory 38, and I/O (input/output) controller 42. The memory 38 includes a flow manager application 40, which includes instructions that execute on the processor 36 to form the flow manager that manages the flow of data between the client 22 and a server 34 through the network device 30. The client 22 makes requests for content through the network switch 22, the router 26-1, the network 28, and the router 26-2 to the network device 30. The network device 30 selects one or more servers 34 to respond to the requests. The flow manager 32 manages the flow of data so that the client 22 communicates over pathways passing through the network device 30 when different servers 34 respond to different requests, while the part of the pathway from the client 22 to the network device 30 remains the same. The process of managing the data flow is described in more detail later in the discussion of the flow chart in FIG. 2.

The client 22 is a computing system including a processor, memory, input/output controller, and communication hardware that enables communication over a network or other connection to the network switch 24. In another embodiment, the client 22 communicates directly with the network device 30 (e.g., content switch or router) without communicating through any intermediary devices (i.e., without communicating through a network switch 24 or router 26). The network switch 24 is a network device that switches network packets (e.g., in a local area network) among computers and/or data communication devices, such as the router 26-1 shown in FIG. 1. The routers 26-1, 26-2 are data communication devices that route network packets (e.g., IP packets) to a destination (e.g., an IP address accessed via the Internet). In the example shown in FIG. 1, the router 26-1 routes network packets received from the client 22 via the network switch 24 over the network 28 to router 26-2, which routes the network packets to the network device 30. The network switch 24 and router 26 are network devices, such as computerized devices having memory, input/output controller, and communication hardware that enables communication over a network with other switches 24, other routers 26, the network device 30, clients 22, and servers 34. The network 28 is network capable of transmitting data in chunks, such as packets, among clients 22, servers 34, network switches 24, routers 26, and network devices 30. In one embodiment, the network 28 is a packet-based global network, such as the Internet.

In one embodiment, a computer program product 80 including a computer readable medium (e.g. one or more CD-ROM's, diskettes, tapes, etc.) provides software instructions for the flow manager 32. The computer program product 80 can be installed by any suitable software installation procedure, as is well known in the art. In another embodiment, the software instructions can also be downloaded over a wireless connection. A computer program propagated signal product 82 embodied on a propagated signal on a propagation medium (e.g. a radio wave, an infrared wave, a laser wave, sound wave, or an electrical wave propagated over the Internet or other network) provides software instructions for the flow manager 32. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 80 is a propagation medium that the computer can receive and read, such as by receiving the propagation medium and identifying a propagated signal embodied in the propagation medium, as described above for the computer program propagated signal product 82. The software instructions for the flow manager 32 can also be stored in nonvolatile storage in the network device 30 (e.g., content switch).

As described later in more detail for FIG. 2, the client 22 receives content from multiple servers 34 using the techniques of the invention. First, the client 22 establishes a connection (e.g., TCP connection) with the network device 30 using a virtual IP (VIP) address. The virtual IP (VIP) address is an IP address provided by the network device 30 that represents (or substitutes for) one or more of the IP addresses of the servers 34-1 through 34-4 that may provide the data in response to the request. The client 22 establishes the connection between the client 22 through the network switch 24, router 26-1, network 28, and router 26-2 to the input/output controller 42 of the network device 30. The client 22 and network device 30 exchange SYN transmissions to establish and synchronize the TCP connection, as will be discussed in more detail for FIGS. 3A and 3B. After the client 22 establishes the TCP connection, the client 22 makes a request (e.g., HTTP GET request) over the TCP connection to the network device 30.

The network device 30 receives the request from the client 22, selects one of the servers 34 that is best suited to respond the request (based on the content of the request, quality of server, and/or other factors) and establishes a second connection to the selected server 34. That server 34 then provides the content requested to the network device 30, which then transmits the content to the client 22.

Figure 2:
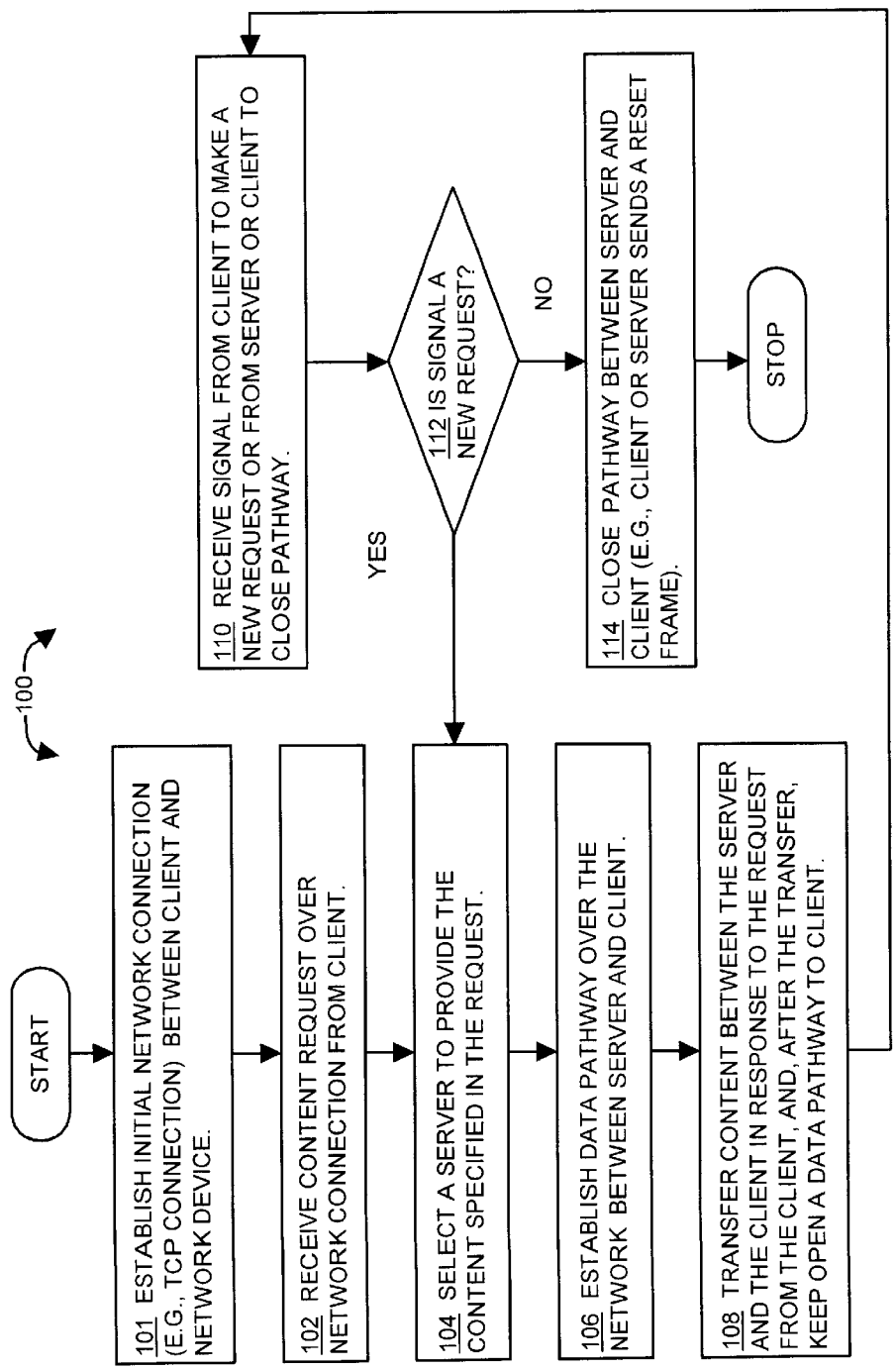
FIG. 2 shows a flow diagram of a procedure for directing data flow within the network connection system illustrated in FIG. 1.

The client 22 can then provide additional requests to obtain content from other servers 34 using the same connection session, as described by the procedure 100 for directing flow data illustrated in FIG. 2.

In step 101 of the procedure 100 shown in FIG. 2, the I/O controller 42 establishes the initial network connection (e.g., TCP connection) between the client 22 and the network device 30, as will be discussed in more detail later. In step 102, the I/O controller 42 receives a content request over the network 28 from a client 22. The I/O controller 42 receives the request over a TCP connection established by synchronization (e.g., SYN) transmissions between the network device 30 and the client 22. For example, the client 22 wishes to make a content request for data to be transmitted to the client 22 (e.g., an HTTP GET request). The client 22 directs this request to an IP address of the network device 30. This IP address is a virtual IP (VIP) address provided by the network device 30 that is one address that represents the IP addresses of the servers 34-1 through 34-4 that provide the data in response to the request. That is, the client accesses the VIP address, which is an IP address provided by the network device 30, as though it is a server 34 address, and the client 22 receives data from the network device 30 as though the client 22 is communicating directly with a server 34. By providing a VIP, the client 22 can make a request to the network device 30 without having to specify the IP address of a specific server 34. After receiving the request, the network device 30 then determines which server 34 is best suited to respond to the request, as will be discussed in more detail later.

In step 108, the network device 30 transfers the content from the server (e.g. 34-1) to the client 22 in response to the request by the client 22. After the transfer of the content, the network device 30 allows the data pathway between the client 22 and the server (e.g., 34-1) to flow through the network device 30, and the network device 30 takes no action to terminate the pathway. For example, the network device 30 does not transmit a termination transmission, such as a RESET, to the client 22 and/or the server (e.g., 34-1) that would result in terminating the connections to the client 22 and/or server (e.g., 34-1).

In step 106, the network device 30 establishes a data pathway over the network 28 from the client 22 to the server (e.g., 34-1) selected in step 104. For example, the flow manager 32 of the network device 30 establishes a TCP connection from the input/output controller 42 of the network device 30 to the server (e.g., 34-1). The flow manager 32 thus establishes a data flow pathway from the client 22 to the server (e.g., 34-1) using the connection already established between the client 22 and the network device 30 and the newly established connection from the network device 30 to the server (e.g., 34-1) selected in step 104.

In step 108, the network device 30 transfer the content from the server (e.g. 34-1) to the client 22 in response to the request by the client 22. After the transfer of the content, the network device 30 allows the data pathway between the client 22 and the server (e.g., 34-1) to flow through the network device 30, and the network device 30 takes no action to terminate the pathway. For example, the network device 30 does not transmit a termination transmission, such as a reset, to the client 22 and/or the server (e.g., 34-1) that would result in terminating the connections to the client 22 and/or server (e.g., 34-1).

In step 110, the input/output controller 42 of the network device 30 receives a signal from the client 22 to make a new content request or receives a signal from the server (e.g., 34-1) or the client 22 to terminate the pathway extending from the client 22 to the server (e.g., 34-1). In step 112, the network device 30 decides if the signal received from the client 22 is a new request or not.

If the signal is a new request, then, in step 104, the network device 30 selects a server 34 to provide the content specified in the request. If the server 34 is the same server (e.g. 34-1) used for the previous request, then the flow manager 32 uses the existing pathway from the client 22 to the server 34-1 and transfers the requested content from the server (e.g., 34-1) to the client 22. If the selected server (e.g., 34-3) is different from the previous server (e.g., 34-1), then the flow manager 32 establishes a new pathway from the client 22 to the server (e.g., 34-3), as discussed in more detail for FIGS. 3A and 3B. If the flow manager 32 establishes a new pathway, the flow manager 32 maintains the existing pathway from the client 22 to the network device 30 as part of the new pathway. In one embodiment, the flow manager maintains the existing TCP connection from the client 22 to the network device 30, while establishing a new pathway between the client 22 and the new server (e.g., 34-3). Because the client 22 is unaware that a remapping of the content requests from one server (e.g., 34-1) to another server (e.g., 343) has occurred, the client 22 does not incur latencies associated with reforming the TCP connection between the client 22 and the server 34, with processing an HTTP redirect request to another server 34, and with having to reopen via the TCP slow start mechanism the request windows in the TCP connection. The flow manager 32 handles a second request without requiring a redirect request, which are not allowed in some cases. For example, certain software applications (e.g., some Internet Explorer implementations provided by Microsoft® Corporation, Redmond, Wash.) will not allow an HTTP redirect to the same IP address because the software applications mistakenly believe they are protecting against redirect loops.

Figure 3A:
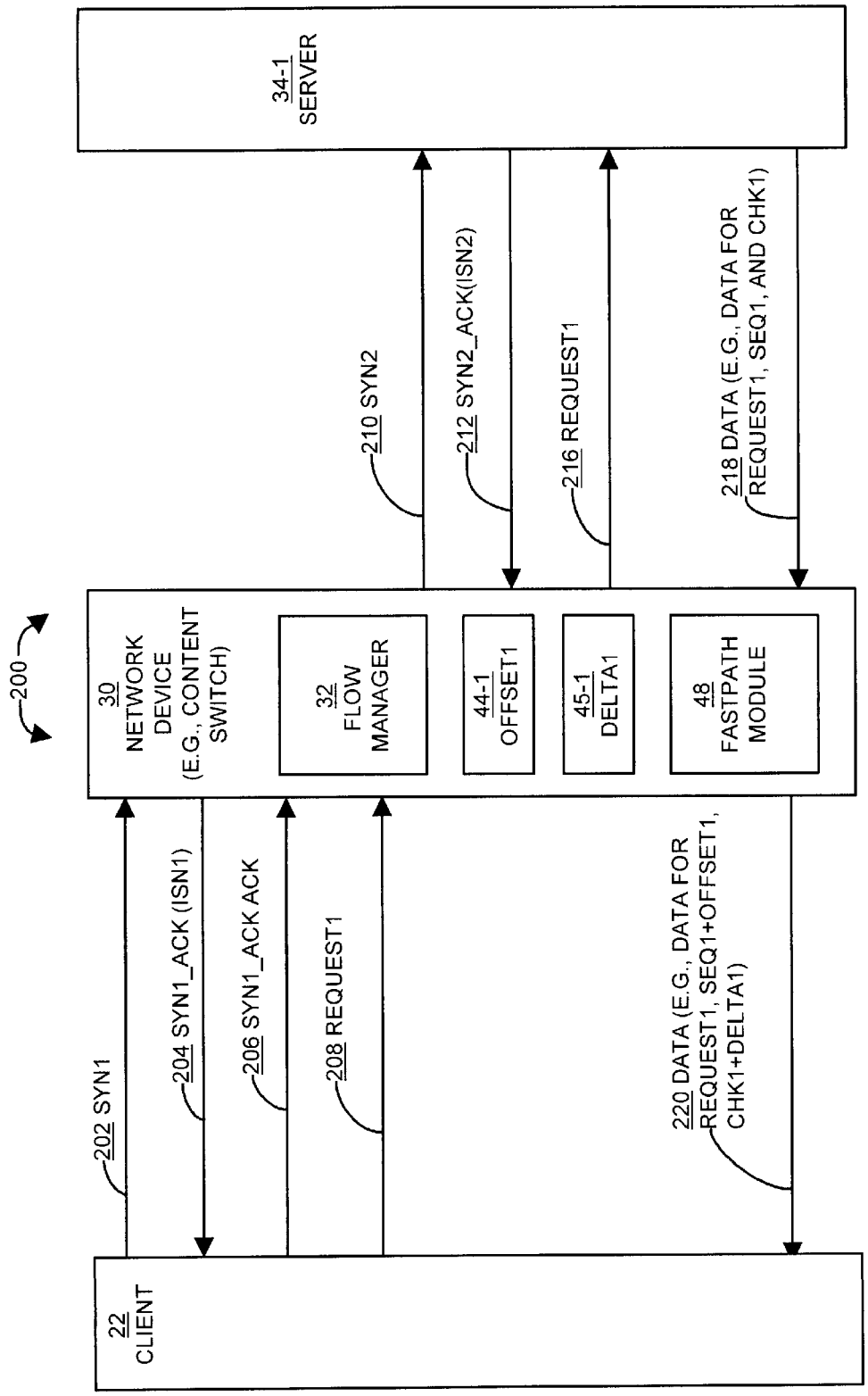
FIG. 3A shows a block diagram of communications between a client and a server in a portion of the network connection system of FIG. 1.
Figure 3B:
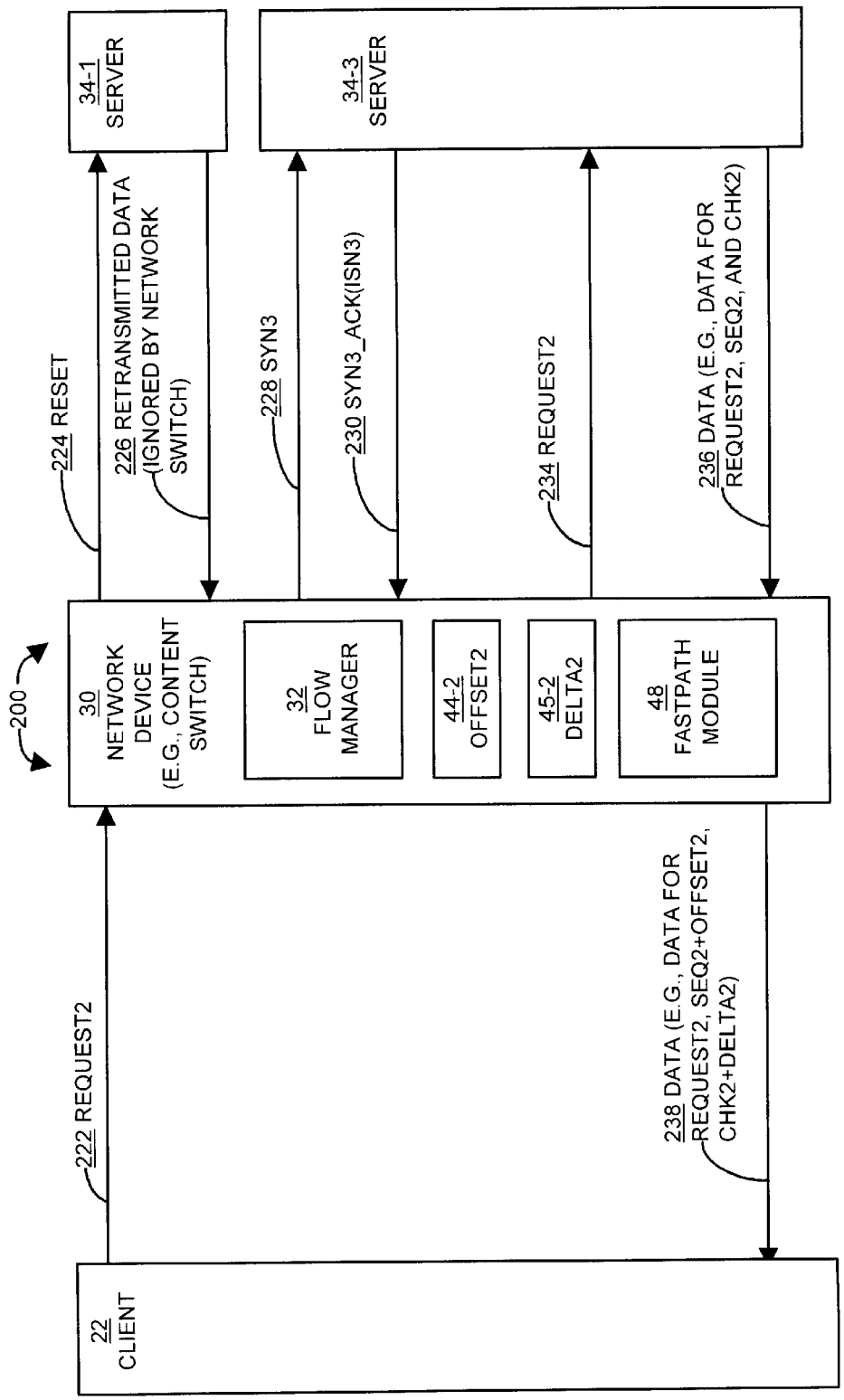
FIG. 3B shows a block diagram of further communications between the client of FIG. 3A and another server.

If the signal is an indication by the server 34 or the client 22 to terminate the pathway between the client 22 and the server 34, then, in step 114, the client 22 or server 34 closes the pathway (e.g., the client 22 sends a RESET transmission through the network device 30 to the server 34 to terminate the pathway). FIGS. 3A and 3B, to be discussed next, provide examples of the typical RESET, synchronization, and other signals transmitted between the client 22 and servers 34.

FIG. 3A shows a block diagram of communications between a client 22 and a server 34-1 in a client-server system 200, which is a portion of the network connection system 20 of FIG. 1, and FIG. 3B, to be discussed later, shows a block diagram of further communications between the client 22 and another server 34-3. FIG. 3A illustrates a client 22, a network device 30 (e.g., content switch), and server 34-1. The network device 30 includes a flow manager 32, fastpath module 48, sequence offset value OFFSET1 44-1, and checksum delta value DELTA1 45-1. The offset value 44-1 and delta value 45-1 are discussed in connection with FIG. 5. The fastpath module 48 is a programmable module, for example, including one or more processors, such as an embedded microprocessor or other programmable IC (integrated circuit). The fastpath module 48 moves data packets received from the server 34 through the network device 30 to be transmitted to the client 22 based on the programming of the fastpath module 48 so that the movement of the data packets through the network device 30 is quicker compared to the movement of data packets that would not be subject to preprogrammed processing and require individual evaluation and processing by the network device 30. In some cases, the flow manager 32 does not program the fastpath module 48, but handles the TCP frames on a frame by frame basis (e.g., for a DNS lookup frame).

FIG. 3A also illustrates signals 202 through 220 transmitted between the network device 30 and the client 22 or server 34-1. The process of exchanging the signals is summarized here, and the process of managing the data flow while maintaining sequence numbers transmitted from the network device 30 to the client 22 is discussed in connection with the flow chart illustrated in FIG. 4.

In FIG. 3A, the SYN1 signal 202 is a synchronization signal transmitted by the client 22 to initiate a connection with the network device 30. The network device 30 returns to the client 22 a SYN1_ACK signal 204, which is an acknowledgment of the SYN1 signal 202. The network device 30 provides an initial sequence number, ISN1, with the SYN1_ACK signal 204, which is an initial sequence number that initializes a sequence space based on the TCP protocol (i.e., ISN1 is the initial sequence number for a series of sequence numbers provided by the network device 30 to the client 22 provided in TCP transmissions between the network device 30 to the client 22). The client 22 also provides an initial sequence number (not shown in FIG. 3A) with the SYN1 signal 202. The sequence numbers provided by the client 22 are not modified by the network device 30, in contrast to sequence numbers provided by one or more servers 34, which are modified by the network device 30 to preserve the sequence space initialized by the initial sequence number, ISN1, provided in the SYN1_ACK signal 204, as described in more detail for FIGS. 4, 5, and 6.

The SYN1_ACK ACK signal 208 provided by the client 22 to the network device 30 is an acknowledgment of the SYN1_ACK signal 204. By sending the SYN1_ACK ACK signal 208 to the network device 30, the client 22 establishes a TCP connection between the client 22 and the network device 30. The client 22 transmits a REQUEST1 signal 208 (e.g., HTTP GET request) to the network device 30 over the TCP connection established by the exchange of the SYN1 signal 202, the SYN 1_ACK signal 204, and the SYN1_ACK ACK signal 206 between the client 22 and the network device 30. The REQUEST1 signal 208 includes a content request by the client 22 for data to be returned to the client 22 from the server 34-1 through the network device 30.

The SYN2 signal 210 is a synchronization signal transmitted by the network device 30 to initiate a connection with the server 34-1. The server 34-1 returns to the network device 30 a SYN2_ACK signal 212, which is an acknowledgment of the SYN2 signal 210. The server 34-1 provides an initial sequence number, ISN2, with the SYN2_ACK signal 212, which is an initial sequence number for a series of sequence numbers provided in TCP transmissions from the server 34-1. By the exchange of the signals 210, 212, the server 34-1 establishes a TCP connection between the server 34-1 and the network device 30. The network device 30-1 transmits to the server 34-1 the REQUEST1 signal 216, which includes the same request as the one provided in the REQUEST1 signal 208 from the client 22 to the network device 30.

The server 34-1 transmits to the network device 30 the DATA signal 218, which includes the data requested in the REQUEST1 signal 216 and a sequence number (SEQ1), indicating a sequence number received by the network device 30 from the server 34-1 that handles the first request (REQUEST1). The DATA signal 218 also includes a checksum value (CHK1) indicating a checksum for the DATA signal 218 that can be used to verify the integrity of the signal 218. The network device 30 transmits to the client 22, the DATA signal 220, which includes the same data provided by the signal 218 from the server 34-1 to the network device 30. In the DATA signal 220 provided by the network device 30, the fastpath module 48 as programmed by the flow manager 32 adjusts the value of a sequence number (SEQ1) provided in the DATA signal 218 from the server 34-1 3 (e.g., adds the OFFSET1 to the SEQ 1) to preserve the sequence space (i.e., series of sequence numbers provided from the network device 30 to the client 22) and adjusts the checksum (e.g., adds the checksum delta value DELTA1 to CHK1) to preserve the validity of the checksum, as will be discussed in more detail for FIG. 5.

FIG. 3B shows a block diagram of further communications between the client 22 of FIG. 3A and another server 34-3. The network device 30 includes a sequence OFFSET2 value 44-2 and a checksum DELTA2 value 45-2, which are discussed in connection with FIG. 6. FIG. 3B illustrates signals 222 through 238 transmitted between the network device 30 and client 22 or the server 34-3. The process of exchanging signals is summarized here, and discussed in more detail in connection with the flow chart illustrated in FIG. 6.

In FIG. 3B, the client 22 transmits a REQUEST2 signal 222 (e.g., HTTP GET request) to the network device 30 over the TCP connection established by the exchange of the SYN1 signal 202, the SYN1_ACK signal 204, and the SYN1_ACK ACK signal 206 between the client 22 and the network device 30. The REQUEST2 signal 208 includes a content request from the client 22 for data. After deciding to service the request in the REQUEST2 signal 208 with a server 34-3 that is different from server 341, the network device 30 sends a RESET signal 224 to terminate the connection between the server 34-1 and the network device 30. If the server 34-1 does not receive the RESET signal 224 and attempts to send a DATA signal 226 (e.g., retransmit data) to the network device 30, then the network device 30 ignores the data signal 226.

The SYN3 signal 228 is a synchronization signal transmitted by the network device 30 to initiate a new TCP connection with the server 34-3. The server 34-3 returns to the network device 30 a SYN3_ACK signal 230, which is an acknowledgment of the SYN3 signal 228. The server 34-3 provides an initial sequence number, ISN3, with the SYN3_ACK signal 212, which is an initial sequence number for a series of sequence numbers provided in TCP transmissions from the server 34-3.

By the exchange of the signals 228, 230, the server 34-3 establishes a TCP connection between the server 34-3 and the network device 30. The network device 30 transmits to the server 34-3 the REQUEST2 signal 234, which includes the same request as the one provided in the REQUEST2 signal 222 from the client 22 to the network device 30.

The server 34-3 transmits to the network device 30 the DATA signal 236, which includes the data requested in the REQUEST2 signal 234 and a sequence number (SEQ2), indicating a sequence number received by the network device 30 from the server 34-3 that handles the second request (REQUEST2). The DATA signal 236 also includes a checksum value (CHK2) indicating a checksum for the DATA signal 236 that can be used to verify the integrity of the signal 236. The network device 30 transmits to the client 22 the DATA signal 238, which includes the same data provided by the DATA signal 236 from the server 34-3 to the network device 30. In the DATA signal 238 provided by the network device 30, the fastpath module 48 as programmed by the flow manager 32 modifies the value of a sequence number (e.g., SEQ2) provided in the DATA signal 236 from the server 34-3 (e.g., adds the OFFSET2 to the SEQ2) and adjusts the checksum (e.g., adds the checksum delta value DELTA2 to CHK2), as will be discussed in more detail for FIG. 6.

Figure 4:
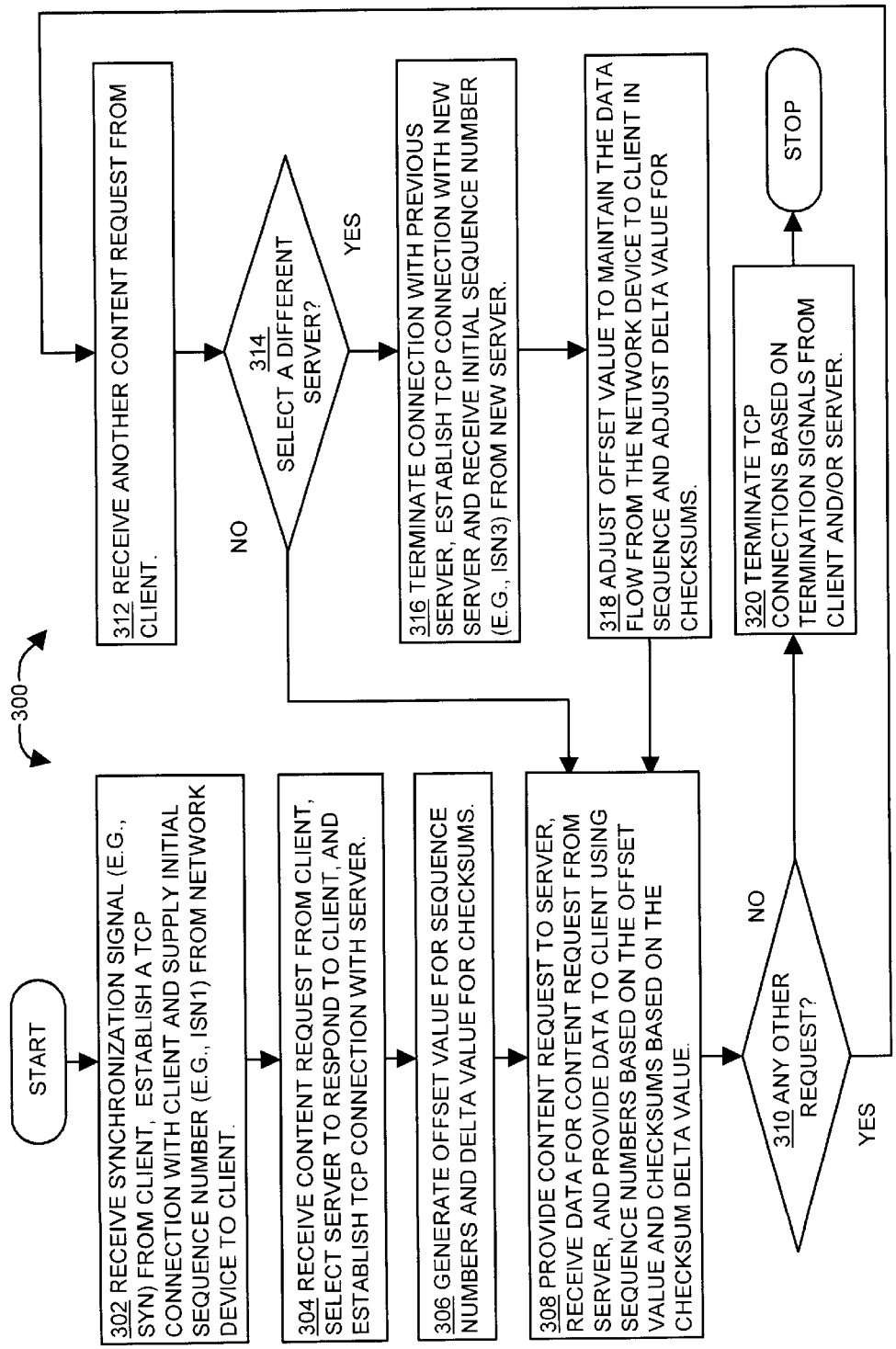
FIG. 4 shows a flow diagram of a procedure for maintaining data sequence numbers provided by a network switch for the portion of the network connection system illustrated in FIGS. 3A and 3B.

FIG. 4 shows a flow diagram of a procedure 300 for maintaining data sequence numbers provided by a network device 30 to the client 22 for the client-server system 200 illustrated in FIGS. 3A and 3B. In step 302, the network device 30 receives a synchronization signal (e.g., SYN1 signal 202) from the client 22 to establish a TCP connection between the network device 30 and the client 22. The flow manager 32 establishes the TCP connection with the client 22 by exchanging a SYN1_ACK signal 204 and SYN1_ACK ACK signal 206 with the client 22 as discussed previously for FIG. 3A. The flow manager 32 provides an initial sequence number, ISN1, to the client 22 with the SYN1_ACK signal 204.

In step 304, the I/O controller 42 of the network device 30 receives a content request from the client 22. The network device 30 selects a server 34 to respond to the client 22, and establishes a TCP connection with the server 34. For example, the I/O controller 42 receives a REQUEST1 signal 208 from the client 22 that includes the content request. The network device 30 decides which server 34 to service the request based on the content of the request, and other factors, such as quality of service, as discussed previously for FIG. 2. For example, the content request in the REQUEST1 signal 208 is a request for audio content, and the network device 30 selects the server 34-1 to service the request from the client 22, because the server 34-1 is best suited to provide the audio data in response to the request.

In step 306, the flow manager 32 generates an offset value (e.g., OFFSET1) and a checksum delta value (e.g., DELTA1), as described later for FIG. 5. In step 308, the flow manager 32 provides the content request to the server 34-1 (e.g., in the REQUEST1 signal 216), receives data for the content request from the server 34-1 (e.g., in the DATA signal 218), and provides data to the client 22 using sequence numbers based on the offset value. For example, the flow manager 32 modifies the sequence numbers by programming the fastpath module 48 to add the offset value to the sequence number (e.g., SEQ1) received from the server 34-1 in DATA signal 218 (e.g., adds OFFSET1 to SEQ1). The flow manager 32 also adjusts the checksum for the DATA signal 218 (e.g., adds the checksum delta value DELTA1 to CHK1)

In step 310, the network device 30 determines if there are any other requests from the client 22. For example, the I/O controller 42 monitors the client 22 for any HTTP requests transmitted from the client 22 to the network device 30 or a signal, such as a RESET signal, from the client 22 indicating that the client 22 is terminating the TCP connection with the network device 30. If there are no other requests and the server 34-1 and/or client 22 end the connection between the server 34-1 and the client 22 (e.g., one or both send RESET signals), then, in step 320, the TCP connection between the client 22 and the network device 30 and the TCP connection between the network device 30 and the server 34-1 terminate. If there is another content request, the network device 30, in step 312, receives the content request.

In step 314, the network device 30 decides whether the same server (e.g., 34-1) is best suited to service the newly received content request, or whether another server (e.g., 34-2, 34-3, or 34-4) is best suited. If the same server (e.g., 34-1) is best suited to respond to the content request, then the network device 30 proceeds to step 308.

If a different server (e.g., 34-3) is best suited to respond to the network device 30, then the network device 30 proceeds to step 316. In step 316, the network device 30 terminates the TCP connection with the previous server (e.g., 34-1) and establishes a TCP connection with the newly selected server (e.g., 34-3). As part of the process of establishing the TCP connection, the network device 30 then receives an initial sequence number (e.g., ISN3 as part of the SYN3_ACK signal 230) from the new server (e.g., 34-3).

In step 318, the flow manager 32 adjusts the offset value to maintain the data flow from the network device 30 to the client 22 in sequence and adjusts the delta value for the checksums. For example, the flow manager 32 calculates a new offset value (e.g., OFFSET2), as described in FIG. 6. The network device 30 then proceeds to step 308, and provides sequence numbers (e.g., SEQ2) in the data provided to the client (e.g., DATA signal 238) based on the new offset value (e.g., add OFFSET2 to SEQ2) and new checksum value (e.g., add DELTA2 to CHK2).

Figure 5:
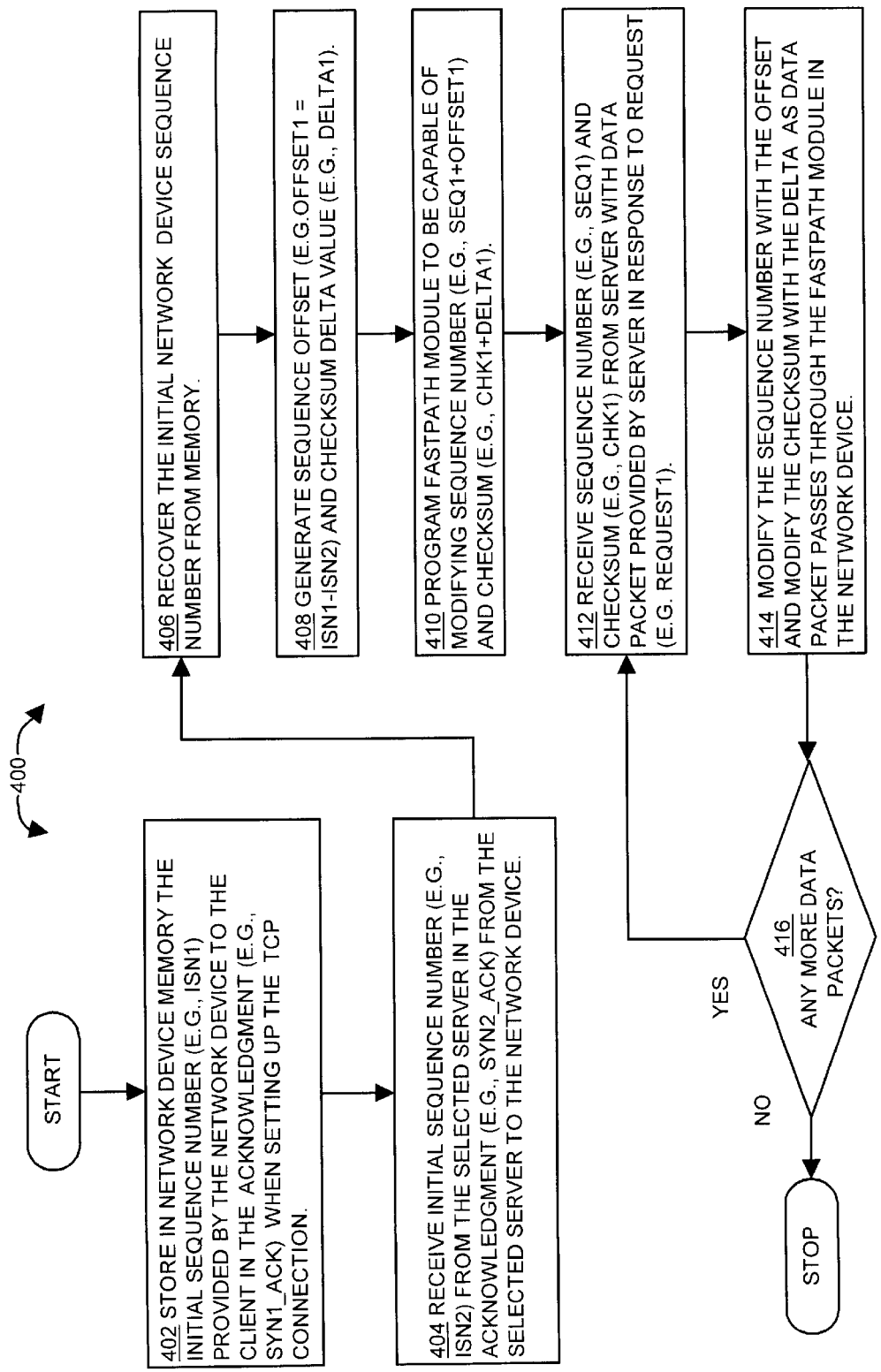
FIG. 5 shows a flow diagram of a procedure for modifying sequence numbers received by a network switch from a server for the portion of the network connection system illustrated in FIGS. 3A and 3B.

FIG. 5 shows a flow diagram of a procedure 400 for modifying sequence numbers received by a network device 30 from a server 34 for the client-server system 200 illustrated in FIGS. 3A and 3B. In step 402, the flow manager 32 stores in the network device memory 38 the initial sequence number (e.g., ISN1) provided by the network device 30 to the client 22 in the acknowledgment (e.g., the SYN1_ACK signal 204) when setting up the TCP connection.

In step 404, the network device 30 receives the initial sequence number (e.g. ISN2) from the selected server 34-1 in the acknowledgment (e.g., the SYN2_ACK signal 212) from the selected server 34-1 to the network device 30.

In step 406, the flow manager 32 recovers the network device 30 initial sequence number (e.g., ISN1) from memory 38. In step 408, the flow manager 32 generates an offset (e.g., OFFSET1) by subtracting the server 34-1 initial sequence number from the network device 30 initial sequence number (e.g., OFFSET1=ISN1−ISN2). The flow manager 32 also generates a checksum delta value (e.g., DELTA1), as described later. In step 410, the flow manager 32 programs the fastpath module 48 to be capable of modifying sequence numbers and checksums associated with data as the data, sequence numbers and checksums flow through the fastpath module 48. In one embodiment, the flow manager 32 stores the modification information (e.g., offset transforms that modify the sequence numbers received from the server 34-1 and checksum transforms that modify the checksums) in a memory associated with the processor in the fastpath module 48 or the network device memory 38, and the fastpath module 48 retrieves the modification information as needed to modify the sequence numbers and checksums.

For example, the network device 30 receives data (e.g. DATA signal 218) from a server (e.g., 34-1) that includes a sequence number (e.g., SEQ1). The flow manager programs the fastpath module 48 so that, as the data and sequence number (e.g., SEQ1) pass through the fastpath module 48, the fastpath module 48 modifies the sequence number. For example, the modified sequence number in the DATA signal 220 equals SEQ1+OFFSET1. In one embodiment, the flow manager calculates the OFFSET1 as the difference between ISN1 and ISN2 using a binary approach (e.g., 32-bit binary mathematics), and then adds SEQ1 and OFFSET1.

The modification is necessary to insure that the sequence numbers provided by the network device 30 to the client 22 are in sequence according to the TCP protocol (i.e., are consistent with the sequence space initialized by the first initial sequence number, ISN1, returned from the network device 30 to the client 22). In one embodiment, the flow manager 32 recalculates or modifies the checksums (e.g., CHK1 and CHK2) associated with the data packets received from the server 34 so that the checksums are consistent with the modified sequence numbers used in the data packets (e.g., DATA signal 220) provided by the network device 30 to the client 22. For example, the flow manager 32 calculates a checksum delta value (e.g., DELTA1 or DELTA2) based on the change in the offset values (e.g., OFFSET1 or OFFSET2) and on the change in the IP addresses provided in the data packets received from the server 34 (e.g., change in IP address from the IP address of the server 34 to the virtual IP address provided by the network device 30). The flow manager 32 then programs the fastpath module 48 to modify the checksum value received from the server 34 (e.g., add DELTA1 to CHK1). By modifying the checksum value, the fastpath module 48 insures that a checksum for a signal (e.g., DATA signal 220) sent from the network device 30 to the client 22 is valid for the signal (e.g., DATA signal 220) so that the client 22 can use the checksum value to verify the integrity of the signal (e.g., DATA signal 220). In another embodiment, the flow manager 32 recalculates the checksum for a signal (e.g. DATA signal 220) rather than modifying the checksum with a checksum delta value.

In step 412, the network device 30 receives a sequence number (e.g., SEQ1) and checksum (e.g., CHK1) from the server (e.g., 34-1) with a data packet provided by the server (e.g., DATA signal 218) in response to the request from the client (e.g., the REQUEST1 signal 208 which was transmitted to the server 34-1 as the REQUEST1 signal 216).

In step 414, the fastpath module 48 modifies the sequence number (e.g., SEQ 1) with the offset (e.g., by adding the OFFSET1) as the data packet (e.g., DATA signal 218) passes through the fastpath module 48 in the network device 30. The fastpath module 48 also modifies the checksum (e.g., CHK1) with the checksum delta (e.g., by adding DELTA1) as the data packet (e.g., DATA signal 218) passes through the fastpath module 48. The result is a data packet with a modified sequence number and modified checksum (e.g., as in DATA signal 220).

In step 416, the network device 30 monitors the connection with the server (e.g. 34-1) to determine if there are any more data packets arriving from the server (e.g., 34-1). If there are no more data packets (e.g., if the server 34-1 has provided all of the data in response to the REQUEST1 signal 216), then the procedure 400 stops. If there are more data packets, then the flow network device 30 proceeds to steps 412 and 414.

Figure 6:
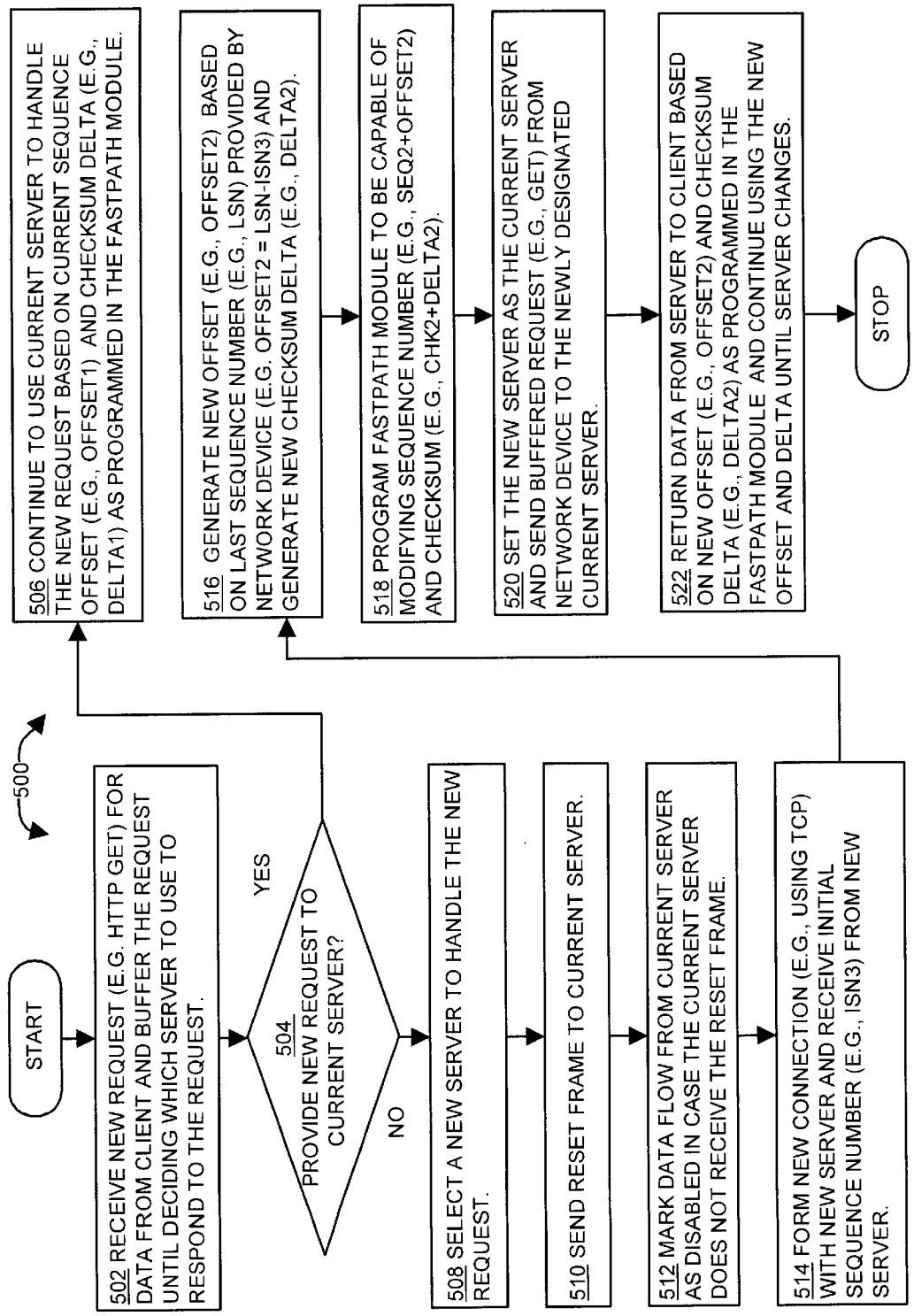
FIG. 6 shows a flow diagram of a procedure for changing from a current server to a new server for the portion of the network connection system illustrated in FIGS. 3A and 3B.

FIG. 6 shows a flow diagram of a procedure 500 for changing from a current server (e.g., 34-1) to a new server (e.g., 34-3) for the client-server system 200 illustrated in FIGS. 3A and 3B.

In step 502, the I/O controller 42 of the network device 30 receives a new request (e.g. HTTP GET) for data from the client 22, and the network device 30 buffers the request until deciding which server 34 to use to respond to the request. For example, the network device 30 receives a content request in a REQUEST2 signal 222 from the client 22 and buffers the request provided in the REQUEST2 signal 222.

In step 504, the network device 30 decides whether to provide the new request to the current server (e.g., 34-1). For example, the network device 30 decides whether to provide the content request provided in the REQUEST2 signal 222 to the current server (e.g., 34-1). If the network device 30 provides the content request to the current server (e.g., 34-1), the network device 30 proceeds to step 506. In step 506, the network device 30 continues to use the current server (e.g., 34-1) to handle the new request based on the current offset (e.g., OFFSET1) and checksum delta (e.g., DELTA1) as programmed in the fastpath module, as described for FIG. 5. The network device 30 does not need to change the current offset (e.g., OFFSET1) and checksum delta (e.g., DELTA1) as long as the network device 30 maintains the existing TCP connection from the client 22 to the network device 30 and the TCP connection from the network device 30 to the current server (e.g., 34-1).

If the network device 30 decides to provide the request to a new server (e.g. 34-3), then the network device 30 proceeds to step 508. In step 508, the network device 30 selects a new server (e.g., 34-3) to handle the new request. In step 510, the network device 30 sends a RESET frame over the TCP connection to the current server (e.g. 341), which terminates the TCP connection between the network device 30 and the current server (e.g. 34-1). In step 512, the network device 30 marks any incoming data flow from the current server (e.g. 34-1) as disabled in case the current server (e.g. 34-1) does not receive the RESET frame and attempts to transmit a DATA signal 226 to the network device 30.

In one embodiment, the network device 30 selects a new server (e.g., 34-3) to handle the new request from the client 22, as described above, but maintains the TCP connection to the previous (i.e., already bound) server (e.g., 34-1) so that the previous server (e.g., 34-1) does not terminate the connection. The network device 30 provides the data received from the new server (e.g., 34-3) in response to the new request, but does not transfer any data or signals from the previous server (e.g., 34-1) to the client 22 in the response to the new request. In another embodiment, the network device 30 also preallocates connections to different servers (e.g., 34-1 through 34-4). Thus the network device 30 maintains the connections to all of the servers (e.g., 34-1 through 34-4), while selecting one server (e.g., 34-3) to respond to a request received from the client 22.

In another embodiment, the flow manager 32 assigns a different source port number (e.g., port number at the network device 30) to each server 34. For example, the source port number for one server 34-1 is port 1182, and the source port number for server 34-3 is port 1184. The flow manager 32 relies on the source port numbers to help ensure that any data transmission from a supposedly disconnected server (e.g., 341) does not become intermingled with a data transmission from a newly connected server (e.g., 34-3), which may occur, for example, if the previous server (e.g., 34-1) does not receive the RESET signal transmitted to it by the network device 30. In another embodiment, there is no requirement that the port numbers be changed, and the flow manager 32 can use the same port number for different servers 34. For example, the flow manager 32 relies on the source IP addresses in the data packets to distinguish which server 34 is transmitting the packet to the network device 30.

In step 514, the network device 30 forms a new connection (e.g., using TCP) with the new server (e.g., 34-3) and receives the initial sequence number (e.g., ISN3 in the SYN3_ACK signal 230) from the new server (e.g. 34-3).

In step 516, the flow manager 32 generates a new offset (e.g., OFFSET2) based on the last sequence number (e.g., LSN=SEQ1+OFFSET1) provided by the network device 30 to the client 22 and generates a new checksum delta (e.g., DELTA1) as described previously. For example, the offset is the last sequence number minus the initial sequence number from the new server 34-3 (e.g., OFFSET2=LSN−ISN3).

In step 518, the flow manager 32 programs the fastpath module 48 to be capable of modifying the sequence number and the checksum. For example, the flow manager 32 programs the fastpath module 48 to add the offset (e.g., OFFSET2) to the sequence number (e.g., SEQ2) received from the new server (e.g., 34-3) in the DATA signal 236 and to add the checksum delta value (e.g., DELTA2) to the checksum (e.g., CHK2) received in the DATA signal 236. Thus, the remapping of content requests from one server (e.g., 34-1) to another server (e.g., 34-3) consists of tearing down the previous connection, forming a new connection, and recalculating the network and transport layer transformations including TCP sequence and ACK delta offsets and the checksum deltas to insure that the connection may be transformed properly through the fastpath module 48.

In step 520, the flow manager 32 sets the new server as the current server (e.g., 34-3) and sends the buffered request (e.g. HTTP GET request provided in the REQUEST2 signal 234) from the network device 30 to the newly designed current server (e.g., 34-3).

In step 522, the flow manager 32 returns to the client 22 data (e.g. DATA signal 238) received from the server (e.g., DATA signal 236 transmitted from server 34-3) based on the new offset (e.g. OFFSET2) and new checksum delta (e.g. DELTA2) as programmed in the fastpath module 48. The network device 30 continues using the new offset (e.g., OFFSET2) and checksum delta (e.g., DELTA2) until the server 34 changes. In other words, the flow manager 32 does not adjust the offset value programmed in the fastpath module 48 as long as the TCP connection between the network device 30 and the same server 34 is maintained.

The techniques of the invention can be implemented in a variety of data communication devices, including network switches, routers, bridges, and other data communication devices. For example, the techniques of the invention can be implemented within a network flow switch as described according to commonly assigned, U.S. patent application Ser. No. 6,006,264, filed Dec. 21, 1999, entitled "Method and System for Directing a Flow between a Client and a Server," the teachings of which are incorporated by reference in their entirety. This patent discloses a content-aware flow switch (i.e., flow switch) that intercepts a client 22 content request (e.g., HTTP request) and directs the request to the server 34 that is most suitable for the request. The flow switch chooses the server 34 depending on the type of content requested, the quality of service requirements implied in the request, the level of network congestion, and the proximity of the client 22 to the available servers 34. If a server 34 (e.g., local server 34) is not available to service the request from a client 22, then the flow switch instructs the client 22 to redirect the request (e.g., make a new connection and HTTP request) to another server 34 (e.g., remote server 34) to service the request.

While this invention has been particularly shown and described with references to preferred embodiments thereof, it will be understood by those skilled in the art that various changes in form and details may be made therein without departing from the spirit and scope of the invention as defined by the appended claims.

For example, the communication between the client 22 and network device 30 is not required to follow the network arrangement illustrated in FIG. 1. The client 22 can communicate directly with the network device 30 without communicating through network switches 24 and/or routers 26. The network 28 can be any type of network 28 supporting transmissions of packets or other types of chunks of data and suitable for use with computerized devices. The network connection (e.g., the TCP/IP connection between the client 22 and the network device 30) can be any type of suitable network connection that provides for the transmission of data packets or chunks among computerized devices (e.g., clients 22 and servers 34) and network devices 30 (e.g., content switches).

In addition, the sequence numbers referred to herein for the TCP/IP connections (see FIGS. 4, 5, and 6) are not required to be TCP sequence numbers or to be based on a TCP protocol. The techniques of the invention can be applied to other data communication architectures that use a "sliding window" protocol and/or sequence numbers for transferring data. For example, the sequence numbers may be used at the request level. In this example, the content request can establish its own series of content sequence numbers associated with requests and responses at the content layer or level, independently of any lower level protocol (e.g., TCP). The flow manager 32 can establish offsets or another suitable approach for modifying the content sequence numbers so that the content sequence numbers associated with responses provided by the network device 30 from different servers 34 are in sequence at the content level as transmitted to the client 22 from the network device 30.

Furthermore, the client 22 and servers 34 can represent any type of computer regardless of size and type of the computer. That is, the client 22 can be any type of computerized device that makes a request over the network, and the server is any type of computerized device that responds to the request. For example, the client 22 is not required to be a personal computer or one typically used by an individual person. The server 34, for example, is not required to be a dedicated server with a large database, but may be a personal desktop, laptop, palmtop, or other type of computer that responds to a request for data from another computer.

In addition, the network device 30 is not required to be a content switch, or other type of network switch. For example, the network device 30 can be a router, computer, computerized device, or other type of electronic device, that serves as an intermediary between a client 22 and servers 34 and provides the functions of the invention as disclosed herein.

Furthermore, the content requested by a client 22 is not restricted to any particular type of content, and the content can be distributed across the servers 34 in various ways. For example, each of four different servers 34 may provide a different content (e.g., text, audio, video, or image content). In another example, different servers 34 may provide the same content, but the network device 30 assigns different requests to different servers 34 based on a load balancing approach. In a further example, the network device 30 can distribute content among the different servers 34 based on the user name, user account number, user location, or other user identification factor. Regardless of the method used to distribute content among the servers 34, in one arrangement the network device 30 maintains a table or small database that indicates which server 34 to use when receiving a request from the client 22.

What is claimed is:

1. In a network device, a method for managing communication between a client and multiple servers, the method comprising the steps of:

receiving a set of data requests, each data request belonging to a single connection session;

providing a first data pathway between the client and a first server through the network device in response to a first data request of the set of data requests, the first data pathway including a portion of the first data pathway that extends between the client and the network device, wherein the step of providing the first data pathway comprises the steps of:

establishing, as the portion of the first data pathway, a first network connection between the client and the network device;

establishing a second network connection between the network device and the first server; and providing a second data pathway between the client and a second server through the network device in response to a second data request of the set of data requests, the second data pathway including the portion of the first data pathway that extends between the client and the network device, wherein the step of providing the second data pathway comprises the steps of:

maintaining the first network connection between the client and the network device;

establishing a third network connection between the network device and the second server; and prior to the step of establishing the third network connection, sending a request to the first server to close the second network connection between the network device and the first server.

2. The method of claim 1, wherein the step of providing the first data pathway comprises the step of:

selecting, as a destination of the first data pathway, the first server from the multiple servers based on a content type indicated by the first data request.

3. The method of claim 1, wherein the step of providing the second data pathway comprises the step of:

selecting, as a destination of the second data pathway, the second server from the multiple servers based on a content type indicated by the second data request.

4. The method of claim 1, wherein the step of providing a first data pathway comprises the steps of:

receiving a synchronization signal from the client;

providing a first initial sequence number to the client that initializes a sequence space based on a first set of network device sequence numbers provided from the network device to the client;

receiving a second initial sequence number from the first server;

generating a first modification value; and modifying a first set of server sequence numbers based on the first modification value to provide a second set of network device sequence numbers from the network device to the client that preserves the sequence space initialized by the first initial sequence number provided to the client.

5. The method of claim 4, wherein the step of providing the second data pathway comprises the steps of:

receiving a third initial sequence number from the second server;

generating a second modification value; and modifying a second set of server sequence numbers based on the second modification value to provide a third set of network device sequence numbers from the network device to the client, the third set of network device sequence numbers preserving the sequence space initialized by the first initial sequence number provided to the client.

6. The method of claim 1, wherein the step of establishing the third network connection between the network device and the second server includes the step of:

forming the third network connection in response to sending the request from the network device to the first server to close the second network connection in order to prevent intermingling of first transmissions from the first server with second transmissions from the second server.

7. A network device for managing communication between a client and multiple servers, the network device comprising:

an input/output controller; and a flow manager in communication with the input/output controller, wherein:

the input/output controller is configured to receive a set of data requests, each data request belonging to a single connection session;

the flow manager is configured to:

provide a first data pathway between the client and a first server through the input/output controller in response to a first data request of the set of data requests, the first data pathway including a portion of the first data pathway that extends between the client and the input/output controller;

establish, as the portion of the first data pathway, a first network connection between the client and the network device;

establish a second network connection between the network device and the first server;

provide a second data pathway between the client and a second server through the input/output controller in response to a second data request of the set of data requests, the second data pathway including the portion of the first data pathway that extends between the client and the input/output controller;

maintain the first network connection between the client and the network device;

establish a third network connection between the network device and the second server, and send, prior to establishing the third network connection, a request to the first server to close the second network connection between the network device and the first server.

8. The network device of claim 7, wherein the flow manager is configured to select, as a destination of the first data pathway, the first server from the multiple servers based on a content type indicated by the first data request.

9. The network device of claim 7, wherein the flow manager is configured to select, as a destination of the second data pathway, the second server from the multiple servers based on a content type indicated by the second data request.

10. The network device of claim 7, wherein:

the input/output controller is configured to receive a synchronization signal from the client;

the flow manager is configured to provide a first initial sequence number to the client that initializes a sequence space based on a first set of network device sequence numbers provided from the network device to the client;

the input/output controller is configured to receive a second initial sequence number from the first server;

the flow manager is configured to generate a first modification value; and the flow manager is configured to modify a first set of server sequence numbers based on the first modification value to provide a second set of network device sequence numbers from the network device to the client that preserves the sequence space initialized by the first initial sequence number provided by the network device to the client.

11. The network device of claim 10, wherein:

the input/output controller is configured to receive a third initial sequence number from the second server;

the flow manager is configured to generate a second modification value; and the flow manager is configured to modify a second set of server sequence numbers based on the second modification value to provide a third set of network device sequence numbers from the network device to the client, the third set of network device sequence numbers preserving the sequence space initialized by the first initial sequence number provided by the network device to the client.

12. The network device of claim 7, wherein the flow manager is further configured to establish the third network connection between the network device and the second server in response to the request from the network device to the first server to close the second network connection in order to prevent intermingling of first transmissions from the first server with second transmissions from the second server.

13. A network device for managing communication between a client and multiple servers, the network device comprising:

an input/output controller; and managing means for managing data flow, the managing means in communication with the input/output controller, wherein:

the input/output controller is configured to receive a set of data requests, each data request belonging to a single connection session;

the managing means is configured to:

provide a first data pathway between the client and a first server through the input/output controller in response to a first data request of the set of data requests, the first data pathway including a portion of the first data pathway that extends between the client and the input/output controller;

establish, as the portion of the first data pathway, a first network connection between the client and the network device;

establish a second network connection between the network device and the first server;

provide a second data pathway between the client and a second server through the input/output controller in response to a second data request of the set of data requests, the second data pathway including the portion of the first data pathway that extends between the client and the input/output controller;

maintain the first network connection between the client and the network device;

establish a third network connection between the network device and the second server, and send, prior to establishing the third network connection, a request to the first server to close the second network connection between the network device and the first server.

14. A computer program product that includes a computer readable medium having instructions stored thereon for managing communications in a network device between a client and multiple servers, such that the instructions, when carried out by a computer, cause the computer to perform the steps of:

receiving a set of data requests, each data request belonging to a single connection session;

providing a first data pathway between the client and a first server through the network device in response to a first data request of the set of data requests, the first data pathway including a portion of the first data pathway that extends between the client and the network device, wherein the step of providing the first data pathway comprises the steps of:

establishing, as the portion of the first data pathway, a first network connection between the client and the network device;

establishing a second network connection between the network device and the first server; and providing a second data pathway between the client and a second server through the network device in response to a second data request of the set of data requests, the second data pathway including the portion of the first data pathway that extends between the client and the network device, wherein the step of providing the second data pathway comprises the steps of:

maintaining the first network connection between the client and the network device:

establishing a third network connection between the network device and the second server; and prior to the step of establishing the third network connection, sending a request to the first server to close the second network connection between the network device and the first server.

15. A computer program propagated signal product embodied in a propagated medium, having instructions for managing communications in a network device between a client and multiple servers, such that the instructions, when carried out by a computer, cause the computer to perform the steps of:

receiving a set of data requests, each data request belonging to a single connection session;

providing a first data pathway between the client and a first server through the network device in response to a first data request of the set of data requests, the first data pathway including a portion of the first data pathway that extends between the client and the network device, wherein the step of providing the first data pathway comprises the steps of:

establishing, as the portion of the first data pathway, a first network connection between the client and the network device;

establishing a second network connection between the network device and the first server; and providing a second data pathway between the client and a second server through the network device in response to a second data request of the set of data requests, the second data pathway including the portion of the first data pathway that extends between the client and the network device, wherein the step of providing the second data pathway comprises the steps of:

maintaining the first network connection between the client and the network device;

establishing a third network connection between the network device and the second server; and prior to the step of establishing the third network connection, sending a request to the first server to close the second network connection between the network device and the first server.

* * * * *